(12) United States Patent
Rolin et al.

(10) Patent No.: US 12,312,423 B2
(45) Date of Patent: May 27, 2025

(54) PECTIN CHARACTERISED BY A LOW DEGREE OF METHYL ESTERIFICATION AND A HIGH INTRINSIC VISCOSITY

(71) Applicant: CP Kelco ApS, Lille Skensved (DK)

(72) Inventors: Claus Rolin, Køge (DK); Mette Enøe Hansen, Haslev (DK)

(73) Assignee: CP Kelco ApS, Lille Skensved (DK)

( * ) Notice: Subject to any disclaimer, the term of this patent is extended or adjusted under 35 U.S.C. 154(b) by 0 days.

(21) Appl. No.: 18/447,393

(22) Filed: Aug. 10, 2023

(65) Prior Publication Data
US 2023/0383015 A1 Nov. 30, 2023

Related U.S. Application Data

(62) Division of application No. 16/971,572, filed as application No. PCT/EP2019/056682 on Mar. 18, 2019, now Pat. No. 11,773,189.

(30) Foreign Application Priority Data

Mar. 26, 2018 (EP) .................................... 18164090

(51) Int. Cl.
C08B 37/00 (2006.01)
(52) U.S. Cl.
CPC ................................ C08B 37/0048 (2013.01)
(58) Field of Classification Search
None
See application file for complete search history.

(56) References Cited

U.S. PATENT DOCUMENTS

| | | | |
|---|---|---|---|
| 2,444,266 | A | 6/1948 | Owens et al. |
| 3,622,559 | A | 11/1971 | Wiles et al. |
| 4,016,351 | A | 4/1977 | Eschinasi |
| 5,929,051 | A | 7/1999 | Ni et al. |
| 6,699,977 | B1 | 3/2004 | Gerrish et al. |
| 7,446,131 | B1 | 11/2008 | Liu et al. |
| 7,833,558 | B2 | 11/2010 | Larsen et al. |
| 11,773,189 | B2 | 10/2023 | Rolin et al. |
| 2002/0119941 | A1 | 8/2002 | Ni et al. |
| 2008/0166465 | A1 | 7/2008 | Christensen et al. |
| 2012/0309946 | A1 | 12/2012 | Jensen et al. |
| 2017/0073433 | A1 | 3/2017 | Luzio |

FOREIGN PATENT DOCUMENTS

| | | | |
|---|---|---|---|
| CN | 105542033 | A | 5/2016 |
| EP | 0580252 | A2 | 7/1993 |
| RU | 2165713 | C2 | 4/2001 |
| SU | 1791455 | A1 | 1/1993 |
| WO | 2010129153 | A2 | 11/2010 |

OTHER PUBLICATIONS

CN105542033A, 2016, machine translation. (Year: 2016).*
Ou, internet article obtained using the internet archive, https://web.archive.org/web/20160308154336/https://www.ou.edu/research/electron/bmz5364/buffers.html, 2016. (Year: 2016).*
Yoo, J. Agric. Food Chem. 2003, 51, 7410-7417. (Year: 2003).*
Tuerena, J. Sci. Food Agric. 1984, 35, 797-804. (Year: 1984).*
International Search Report and Written Opinion from International Application No. PCT/EP2019/056682, mailed May 29, 2019, 9 pages.
W. E. Devi et al., "Extraction of Pectin from Citrus Fruit Peel and Its Utilization in Preparation of Jelly", IJERT, vol. 3, No. 5, pp. 1925-1932 (May 2014).
M. T. Pacheco et al., "Structural and Rheological Properties of Pectins Extracted from Industrial Sugar Beet By-Products", Molecules 2019, 24, 392 (2019).
Pasandide et al., "Optimization of aqueous pectin extraction from Citrus medica peel", Carbohydrate Polymers, vol. 178, pp. 27-33 (Aug. 24, 2017).
J.C. E. Reitsma et al., "Properties of Amidated Pectins. I. Preparation and characterization of amidated pectins and amidated pectic acids", Food Hydrocolloids, vol. 1, No. 2, pp. 121-127 (1986).
K. Takamine et al., "Sweet potato dietary fiber", Sweet Potato, Chemistry, Processing and Nutrition, Ch. 5, pp. 117-148 (2019).
J. Yang et al., "Extraction, structure, and emulsifying properties of pectin from potato pulp", Food Chemistry, 244, pp. 197-205 (2018).
J. Yang et al., "Optimization of ultrasound-microwave assisted acid extraction of pectin from potato pulp by response surface methodology and its characterization", Food Chemistry, 289, pp. 351-359 (2019).
B.M. Yapo et al., "Effect of extraction conditions on the yield, purity and surface properties of sugar beet pulp pectin extracts", Food Chemistry, 100, pp. 1356-1364 (2007).
S. Yoo et al., "Viscometric behavior of high-methoxy and low-methoxy pectin solutions", Food Hydrocolloids, 20, pp. 62-67 (2006).
Lei ji, et al., "Production of low methoxyl pectin by intrinsic pectin esterase from orange peel", China Food Additives, Issue 5, 2005, pp. 46-51 (English abstract).
Arland T. Hotchkiss et al "Enzymatic Modification of Pectin to Increase Its Calcium Sensitivity while Preserving Its Molecular Weight", J. Agric. Food Chem. 2002, vol. 50, No. 10, pp. 2931-2937.
King et al "In Situ De-esterification of Lime Pectin", J. Sci. Food Agric. 1986, 37, pp. 391-398.
Speirs et al. (J. Sci. Food Agric. 1980, 31, 1287-1294).
Morris et al. (Food Hydrocolloids 22 (2008) 1435-1442).
Al-Rawajfeh, Aiman Eid et al., "The influence of CO2 injection on the carbonate chemistry and scaling in multiple-effect distillers," Desalination and Water Treatment, 7 (2009) pp. 191-197.

(Continued)

*Primary Examiner* — Layla D Berry
(74) *Attorney, Agent, or Firm* — Merchant & Gould P.C.

(57) ABSTRACT

The present invention relates to citrus pectin characterized by a low degree of methyl esterification yet a high intrinsic viscosity, a process for producing pectin using citrus peel and use of an enzyme endogenous to citrus peel to produce pectin.

26 Claims, 5 Drawing Sheets

(56) References Cited

OTHER PUBLICATIONS

Declaration of Ivo Kohls, Nov. 21, 2024, 10 pages.
El-Nawawi, et al., "Production of a low ester pectin by de-esterification of high ester citrus pectin," Elsevier Science Limited, Carbohydrate Polymers, 27 (1995) pp. 191-195.
Heller, et al., "Curium (III) citrate speciation in biological systems: a europium (III) assisted spectroscopic and quantum chemical study," Dalton Transactions, 2012, 41, 13969.
Kurita et al., "Characterization of the pectin extracted from citrus peel in the presence of citric acid," Carbohydrate Polymers, 74 (2009) pp. 725-730.
Lima, A.M.F. et al., "Dynamic Light Scattering and Viscosimetry of Aqueous Solutions of Pectin, Sodium Alginate and their Mixtures: Effects of Added Salt, Concentration, Counterions, Temperature and Chelating Agent," J. Braz. Chem. Soc., vol. 20, No. 9, 2009, pp. 1705-1714.
Masuelli, Martin Alberto, "Viscometric study of pectin. Effect of temperature on the hydrodynamic properties," International Journal of Biological Macromolecules, 48 (2011) pp. 286-291.
Meyer-Hansen, et al., "Molecular shape and functionality of HM pectin," Pectins and pectinases, 2009 pp. 57-70.
Opposition against European Patent No. EP 3774927, Nov. 28, 2024, 60 pages.
Slavov, et al., "Gelation of high methoxy pectin in the presence of pectin methylesterases and calcium," Elsevier Ltd., Carbohydrate Polymers, 77 (2009) pp. 876-884.
Yadav, et al., "Organic acids: microbial sources, production and applications," Research Gate, Chapter 22, Section 4, Functional foods and micronutrients, 2022, pp. 325-337.

* cited by examiner

PECTIN CHARACTERISED BY A LOW DEGREE OF METHYL ESTERIFICATION AND A HIGH INTRINSIC VISCOSITY

CROSS-REFERENCE TO RELATED APPLICATIONS

This application is a divisional application of U.S. patent application Ser. No. 16/971,572, filed on Aug. 20, 2020, now U.S. Pat. No. 11,773,189, which is a U.S. National Stage Application of PCT International Application No. PCT/EP2019/056682, filed on Mar. 18, 2019, which claims the benefit of European Application No. 18164090.5, filed on Mar. 26, 2018, the disclosures of which are incorporated herein by reference in their entirety.

FIELD OF THE INVENTION

The present invention relates to citrus pectin characterized by a low degree of methyl esterification yet a high intrinsic viscosity, a process for producing pectin using citrus peel and use of an enzyme endogenous to citrus peel to produce pectin.

BACKGROUND

Figure 1A:
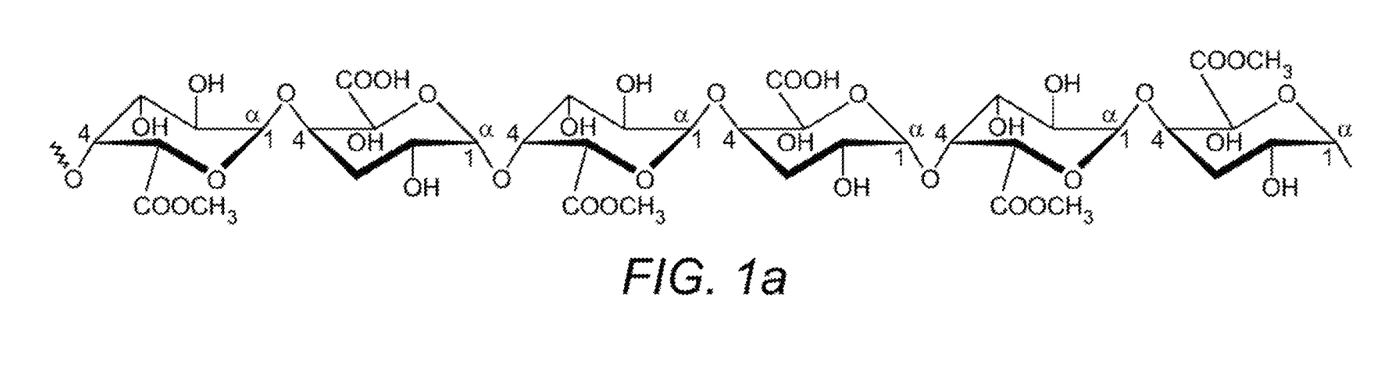
FIG. 1a shows a region of substituted α1→4 linked anhydrogalacturonic acid in pectin.
Figure 1B:
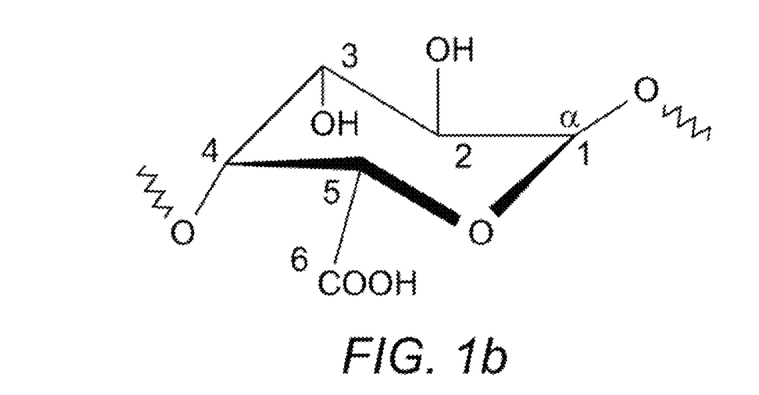
FIG. 1b shows position 6 where substitution occurs.

Pectin is an important polysaccharide with applications in food, pharmaceuticals and various other industries. The polysaccharide chain contains large regions of substituted α1→4 linked anhydrogalacturonic acid (AGU) (FIG. 1a). Substituted refers to the methyl esterification at position 6 (FIG. 1b). The percentage of methyl-esterified carboxyl groups at this position is referred to as "the degree of methyl esterification" or DM in abbreviated form. Commercial pectin is referred to as high methyl ester pectin if the DM is 50 or above (percent). This is commonly referred to as HM-pectin. Pectin with a DM of below 50 is commonly referred to as low methyl ester pectin or LM-pectin.

The DM value strongly influences how the pectin interacts with other materials in a solution and it largely determines what food applications the pectin finds use for. For example, jam with sucrose content about 65% is typically gelled with HM pectin, while LM-pectin is preferred for jam with sucrose content lower than 55%. Another example: HM-pectin is often used for providing yoghurt drinks, while LM pectin normally is preferred for classical yoghurt (that can be eaten with a spoon).

In addition to DM, intrinsic viscosity (IV) is another important value in determining the use of the pectin. IV is the ability of a material to thicken a solvent. Pectin can attain a high IV by maintaining a high number of repeating saccharide units within the pectin polymer.

While the DM of the pectin determines its solubility and should be chosen for matching the quality of the food as a solvent for pectin, the IV of the pectin influences the pectin dosage and the robustness of the desired effect. Pectin of high IV can produce strong and elastic gels that do not readily show instability. Likewise, pectin of high IV can produce stable suspensions of milk protein that have uniformly hazy or "milky" appearance and do not readily exude a thinner liquid or form visible sediment.

Conventional pectin extraction involves acidic conditions. For example, strong mineral acids such as nitric acid are used. However, to preserve a high IV, gentle conditions such as a pH of around 2.4 at a temperature of 70° C. are used for 1 hour which reduces the yield. Once extracted by procedures that ensure a relatively high IV while obtaining a satisfactory yield, the pectin will have a DM of at least about 55 and typically higher. To reduce the DM, the pectin can be incubated with strong acid or alkali. This will release the methyl group from the carboxyl group by hydrolysis (in the case of acid) or saponification (in the case of alkali). However, as well as cleaving the ester, the strong acids or alkalis also degrade the main polysaccharide chain causing a reduction in IV. Therefore, a high IV is sacrificed to lower the DM.

Alternatively, the DM can be reduced by incubating the pectin with a microbial pectin esterase enzyme. This may cause a smaller loss of IV as compared to acid or alkali de-esterification. However, the pectin must first be extracted from the peel for the microbial pectin esterase enzyme to work. Additionally, after catalysis, the enzyme (which must not be viable in the final pectin) must be inactivated by heating the mixture to a high temperature which also reduces the IV.

SUMMARY OF THE INVENTION

The present inventors have developed a process which produces pectin with low DM whilst maintaining high IV.

Accordingly, the present invention provides a citrus pectin characterized by:
  a) a degree of methyl esterification of 30 or less; and
  b) an intrinsic viscosity of 5 dl/g or more.

The pectin may have a degree of methyl esterification of:
  a) 20 or less; b) 15 or less; or c) 10 or less.

The citrus pectin may be a pectin from oranges, lemons, grapefruits or limes.

The pectin may have an intrinsic viscosity of a) 6 dl/g or more; or b) 7 dl/g or more.

The invention also provides a process for producing a pectin characterized by a degree of methyl esterification of 30 or less; and an intrinsic viscosity of 5 dl/g or more, the de-esterification process comprising incubating citrus peel in a solution comprising:
  a) a buffer, wherein the buffer maintains the pH of the solution comprising the peel at pH 5-8; and
  b) a calcium binder.

The resulting pectin produced by this process may be a citrus pectin as described above with a) a degree of methyl esterification of 30 or less; and b) an intrinsic viscosity of 5 dl/g or more.

The incubation period may be 30 minutes or more.

Also provided is use of an enzyme endogenous in citrus peel to de-esterify pectin in the citrus peel. The de-esterification reaction may comprise a) a buffer, wherein the buffer maintains pH at 5-8; and b) a calcium binder.

The following description applies to either the de-esterification reaction of the process or the use.

The buffer may have a concentration of 0.02M or above.

The temperature of the de-esterification reaction may be a) 55° C. to 75° C.; or b) 59° C. to 65° C.

The calcium binder may also act as the buffer. For example, the calcium binding buffer may be a) Na2H-Citrate; b) Na3-Citrate; c) Na2H-phosphate; or d) Na3-phosphate.

Alternatively, or additionally, the calcium binder may comprise cation exchange beads.

The citrus peel may be orange, lemon or lime peel.

Also provided is a pectin obtainable by the process described above.

Throughout the specification, unless the context demands otherwise, the terms 'comprise' or 'include', or variations such as 'comprises' or 'comprising', 'includes' or 'including' will be understood to imply the method or kit includes a stated integer or group of integers, but not the exclusion of any other integer or group of integers.

Each document, reference, patent application or patent cited in this text is expressly incorporated herein in their entirety by reference, which means it should be read and considered by the reader as part of this text. That the document, reference, patent application or patent cited in the text is not repeated in this text is merely for reasons of conciseness. Reference to cited material or information contained in the text should not be understood as a concession that the material or information was part of the common general knowledge or was known in any country.

The invention is further described below by way of example only, and with reference to the accompanying examples.

DETAILED DESCRIPTION

Pectin

Pectin is a polysaccharide chain which contains large regions of substituted α1→4 linked anhydrogalacturonic acid (AGU) (FIG. 1). The pectins from different fruits, vegetables and plants contain different types of sugars. For example, the pectin from Aloe leaves contains a rare sugar 3-OMe-rhamnose which is not found in citrus pectins. The pectins from different fruits, vegetables and plants also vary in the percentages of different types of sugar they contain. For example, apple pectin has a far higher content of xylose than citrus pectin.

The term pectin used herein includes pectin salts, also known as pectates. The pectin described herein is non-amidated pectin as would be understood by the skilled person given the normal definition of pectin.

Degree of methyl esterification

The percentage of methyl-esterified carboxyl groups in pectin is referred to as "the degree of methyl esterification" or DM in abbreviated form.

The degree of methyl esterification of the pectin may be 30 or less. For example, 29, 28, 27, 26, 25, 24, 23, 22, 21, 20, 19, 18, 17, 16, 15, 14, 13, 12, 11, 10, 9, 8, 7, 6, 5 or less. The degree of methyl esterification may comprise a range of any of the above values.

The degree of methyl esterification can be measured in accordance with the protocol provided in the example section.

For example, by titration using an indicator.

Intrinsic Viscosity

The IV of a dissolved polymer (such as pectin) depends upon its composition and covalent structure as well as its interactions with the solvent. The IV can be described as the inherent ability of a material to thicken a solvent in which the material is dissolved in such low concentration that one of its molecules "feels entirely alone". A more precise definition has been provided by the organization IUPAC and will be summarized here: if $\eta$ is the viscosity of a solution of a material with concentration of said material being named c, and we further assume that a series of solutions with different concentrations (c) have been provided and their corresponding viscosities ($\eta$) have been measured, and if we name the viscosity of the pure solvent $\eta_0$, then the intrinsic viscosity of said material in said solvent will be given by $IV = \lim_{c \to 0}((\eta - \eta_0)/(c \cdot \eta_0))$. The part "$\lim_{c=0}$" of this equation means that we extrapolate the values of $((\eta - \eta_0)/(c \cdot \eta_0))$ for the various values of c to c=0. The dimension of IV is the inverse of a concentration, and values are often reported with the unit dl/g.

The classical way of determining intrinsic viscosity (IV) for pectin involves the preparation of several solutions of the pectin and the measurement of the viscosities of these solutions with a viscosimeter.

The more modern technique of liquid chromatography can also be used. A chromatograph equipped with a viscosity detector as well as a detector that quantifies the concentration of the dissolved material can be used. When pectin is chromatographed, a series of connected values for pectin concentration and viscosity can be acquired. The IV can then be interpreted as a statistical population, and an average IV may be calculated.

The IV referred to in this application is an averaged IV, determined with liquid chromatography, for example, gel permeation chromatography. By averaged is meant an average of the values taken around the peak from the chromatogram.

The eluent in which the viscosity is measured may be that used for the chromatography. Examples of suitable eluents include lithium acetate. The eluent may be used at a concentration around 0.3M. For example, 0.1, 0.2, 0.4, 0.5 or The pH of the eluent may be around 4.6. For example, 3.5-5.5. For example, 3.5, 4, 4.5, 5 or 5.5 or a range of any of these values.

The concentration of pectin may be in the range 0.5 mg to 1.5mg/ml. For example, at a concentration of 1mg/ml.

Temperature may be held constant at 37° C. +/−1° C.

For example, viscosity may be measured at 37° C., using 0.3M lithium acetate at pH 4.6 as the solvent.

A detailed protocol for the determination of the IV is provided in the example section below.

The IV may be 5 dl/g or more. For example, the IV may be 5.5 dl/g, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9, 8, 8.1, 8.2, 8.3, 8.4, 8.5, 8.6, 8.7, 8.8, 8.9, or 9 dl/g or more.

Process

The process for producing pectin with a DM of 30 or less and an IV of 5 dl/g or more, comprises incubating citrus peel in a solution comprising: a) a buffer, wherein the buffer maintains the pH of the solution comprising the peel at pH 5-8; and b) a calcium binder.

The inventors hypothesise that the pH strongly influences an endogenous enzyme in citrus peel which can de-esterify pectin (by endogenous enzyme is meant an enzyme naturally present in the citrus peel; by de-esterify is meant reduce the methyl esterification, i.e. the DM). The inventors further hypothesise that the calcium binder removes calcium from the pectin to allow this endogenous enzyme to access the ester bond and cleave the methyl group to de-esterify the pectin and produce LM-pectin. The resulting de-esterified pectin is released into the solution. That is, no extraction of the pectin (for example using acid) is required first before de-esterification. The pectin is de-esterified in situ in the fruit or vegetable biomass and released into solution. As the conditions for the in situ de-esterification are mild to maintain the activity of the endogenous enzyme, the resulting LM-pectin also has a high IV.

The de-esterification conditions for stabilisation of an enzyme are therefore different to those used previously to de-esterify pectin by alkaline saponification or acidic hydrolysis which require highly alkaline or acidic pHs and high temperatures. Therefore, the process does not require an alkaline saponification or acid hydrolysis step for de-esterification which reduces the IV of the pectin because of the extremes of temperature and pH used to de-esterify the pectin. (Saponification generally requires a pH of at least 9. De-esterification by acid generally requires a pH below about 1.2. For example, below a pH of below about 1.5, 2, 2.5 or 3).

A neutralisation step is also often used in the acid hydrolysis and alkaline saponification methods of de-esterification to bring the pH from extreme acid or alkali. This neutralisation step is not needed with the new method herein described as the method is carried out at neutral pH.

This new method using endogenous enzyme also overcomes the drawbacks encountered when using a microbial enzyme as: 1) the pectin does not need to be extracted from the peel first as the reaction happens in the peel with the peel enzymes catalysing the de-esterification of the pectin and releasing it from the insoluble plant material into solution; and 2) the enzyme does not need to be inactivated after it has carried out its catalysis as the enzyme remains in the peel and the peel is filtered away from the solution, for example by a drum vacuum filter.

Other pectin-containing biomass may be added to the solution and pectin from this biomass extracted also as a result of the enzymes from the citrus peel. Alternatively, the citrus pectin described in claims 1-4 or as described above may be the resulting pectin. That is, the pectin produced by the process described herein may be citrus pectin characterized by: a) a degree of methyl esterification of 30 or less; and b) an intrinsic viscosity of 5 dl/g or more.

Buffer and pH

A buffer is a solution which is resistant to changes in pH.

The preferred pH of the process for producing pectin described herein is pH 5-8. For example, pH, 5, 5.1, 5.2, 5.3, 5.4, 5.5, 5.6, 5.7, 5.8, 5.9, 6, 6.1, 6.2, 6.3, 6.4, 6.5, 6.6, 6.7, 6.8, 6.9, 7, 7.1, 7.2, 7.3, 7.4, 7.5, 7.6, 7.7, 7.8, 7.9 or 8. The pH may be a range of any of the individual pH values listed. For example, pH 5-7; or 5-below 8. For example, 5-7.6, or 5-7.7, or 5-7.8, or 5-7.9.

Buffers that work in this pH range include sodium acetate, $Na_2$H-Citrate or $Na_3$-Citrate, $Na_2$H-phosphate, $NaH_2PO_4$ or $Na_3$-phosphate. Any combination of buffers may also be used.

The buffer(s) used in the process maintains the pH within the pH range of 5-8 or any other range derived from the above individual values. By maintains the pH is meant maintains the pH of the solution with the peel added to produce pectin of a degree of methyl esterification of 30 or less and an IV of 5 dl/g or more. For example, keeps the pH of the solution within the pH range of 5-8 for the duration of any of the incubation periods given below.

The buffer(s) may be used at a concentration of 0.01M-0.5M. For example, 0.01M, 0.02M, 0.025M, 0.03M, 0.035M, 0.04M, 0.045M, 0.05M, 0.055M, 0.06M, 0.07M, 0.075M, 0.08M, 0.085M, 0.09M, 0.095M, 0.1M, 0.105M, 0.110M, 0.115M, 0.12M, 0.125M, 0.13M, 0.135M, 0.14M, 0.145M, 0.15M, 0.155M, 0.16M, 0.17M, 0.175M, 0.18M, 0.185M, 0.19M, 0.195M, 0.2M, 0.205M, 0.21M, 0.22M, 0.225M, 0.23M, 0.235M, 0.24M, 0.245M, 0.25M, 0.3M, 0.35M, 0.4M, or 0.5M; or any range derived from any of these values.

As explained above, the inventors hypothesise that the buffer stabilises a pH-dependent enzyme in the citrus peel.

Calcium Binder

In addition to a buffer stabilising the citrus peel enzyme(s) which catalyse the de-esterification, the process also requires a calcium binder.

As explained above, the inventors hypothesise that the calcium binder removes calcium from the pectin in the peel, allowing the de-esterification enzymes to access the ester bond and catalyse the de-esterification reaction.

The calcium binder may be sulphuric acid or a sulphate containing salt; or oxalic acid or an oxalate containing salt.

Preferably, the calcium binder is also a buffer which maintains the process at a pH of In this way, only one solution needs to be added to the peel as the calcium binding buffer fulfils both the function of buffering the process to activate the de-esterification enzyme in the peel; and bind the calcium in the peel so as to allow the de-esterification enzyme access to the pectin in the peel. Therefore, the calcium binder may be a phosphate or citrate buffer. The cation may be monovalent. Monovalent cations aid the solubility of pectin. For example, Na+ or K+. The inventors hypothesise that cations such as Na+ and K+ may also help activate the citrus peel enzyme.

For example, $Na_2$ H-Citrate or $Na_3$-Citrate or a combination of these salts. For example, $Na_2$H-phosphate, $NaH_2PO_4$ or $Na_3$-phosphate.

Alternatively, the calcium binding buffer may be an EDTA buffer, e.g. Na-EDTA; or Na-pyrophosphate.

The calcium binding buffer may be a combination of these buffers or any other calcium binding buffers.

The calcium binder may be a solution added to the peel. Alternatively, the calcium binder may be attached to beads which are added to the peel. For example, cation exchange beads. Cation exchange beads can be used in combination with a buffer, for example, any of the buffer listed in this section or in the "Buffer and pH" section above. The calcium binder or calcium binding buffers may be used at a concentration of 0.01M-0.5M. For example, 0.01M, 0.015M, 0.02M, 0.025M, 0.03M, 0.035M, 0.04M, 0.045M, 0.05M, 0.055M, 0.06M, 0.065M, 0.07M, 0.075M, 0.08M, 0.085M, 0.09M, 0.095M, 0.1M, 0.105M, 0.110M, 0.115M, 0.12M, 0.125M, 0.13M, 0.135M, 0.14M, 0.145M, 0.15M, 0.155M, 0.16M, 0.165M, 0.17M, 0.175M, 0.18M, 0.185M, 0.19M, 0.195M, 0.2M, 0.205M, 0.21M, 0.215M, 0.22M, 0.225M, 0.23M, 0.235M, 0.24M, 0.245M, 0.25M, 0.3M, 0.35M, 0.4M, 0.45M or 0.5M, or any range derived from any of these values. Higher concentrations can also be used. However, the above lower concentrations reduce cost. Higher concentrations may be used and cost balanced if the buffer is recycled.

The concentration of the buffer is before peel is added. For example, 529.4 g $Na_3$-citrate, $2 \cdot H_2O$ is added to 36 l de-ionized water. Peel is also added, but the modest amount of water in the peel is ignored. It is approximated that the peel does not influence the volume of liquid. $Na_3$-citrate, $2 \cdot H_2O$ has the formula weight 294.10, thus the result: conc.=(529.4/294.10)/36 M=0.050 M=50 mM.

Temperature

The process can be carried out at a temperature of 30-75° C. For example, 30, 32, 34, 35, 36, 38, 40, 42, 44, 45, 46, 48, 50, 52, 54, 55, 56, 58, 60, 62, 64, 65, 66, 68, 72, 74 or 75° C. or any range of temperature derived from these values. For example, 55-75° C. or 59-65° C.

Incubation Duration

The incubation of the peel in the solution can be for a duration of 20 minutes or more. For example, 30 minutes or more, 45 minutes or more, 60 minutes or more, minutes or more, 90 minutes or more, 105 minutes or more, 120 minutes or more, 135 minutes or more, 150 minutes or more, 165 minutes or more, 180 minutes or more, 195 minutes or more, 210 minutes or more, 225 minutes or more, 240 minutes or more, 255 minutes or more, 270 minutes or more, 285 minutes or more or 300 minutes or more.

Raw Material for Process

The raw material used for extraction of the pectin comprises citrus peel. The citrus peel may be orange, lemon and/or lime peel.

Use of the Pectin

The resulting pectin can be used for food and beverages. For example in suspending a water-insoluble material in a gel.

EXAMPLES

Aspects and embodiments of the present invention will now be illustrated by way of example only and with reference to the following experimentation.

Protocol for Measuring IV

Determination of Intrinsic Viscosity (IV) of Pectin Based on Orange, Lime and Lemon by FIPA (Flow Injection Polymer Analysis)

Principle

The molecules present in a juice are separated according to their size by gel permeation size exclusion chromatography. In the FIPA setup the pore size of the column is so small that polymer molecules (pectin) are eluted separated from the low-molecular constituents like salts and sugars. The effluent from the chromatography column passes four detectors, Refractive Index (RI), Right and Low Angle Laser Light Scattering (RALLS/LALLS) and a viscosity detector. Intrinsic viscosity is determined from the output of the viscometer detector in combination with the Refractive Index detector. Concentration is only determined from the output of the Refractive Index detector. RALLS is used for the dextran (the control) to determine the Mw in combination with the Refractive Index detector.

Eluent

The eluent or solvent is 0.3 M Lithium acetate buffer at around pH 4.6.

Procedure

Standards and Control:

As control standard use a Dextran with the molecular weight approx.64,000 Daltons, (concentration about 2.0 mg/mL) and a control sample(working batch), pectin with a known IV (concentration 1 mg/mL).

Sample Preparation

Manual sample preparation of milled pectin powder: (pectin and working batch) 1. Approx. 40.0 mg sample is weighed into a 100 mL Blue Cap bottle, use a semi-microanalytical balance (readability 0.01 mg) and record the exact sample amount.

2. Add 100 µL ethanol and drop a magnetic stir bar into the Blue Cap bottle

3. Add 40,0 ml of eluent and close the bottle with a cap.

4. Place the Blue cap bottle on a magnetic stirrer

5. Place the Blue cap bottles in a 75±2° C. block heater with magnetic stirring for 30 min 6. After 30 min, leave the bottle in a 5° C. water bath for 5 min to cool to room temperature.

7. Transfer to an autosampler vial.

Analysis Conditions

Eluent: 0.3 M Li-acetate buffer pH 4.6.

Flow: 1.0 mL/min

Pectin conc.: 1.0 mg/mL

Temperature: 37° C.

Protocol for Measuring DM

Procedure—Determination of % DM Only—by Means of an Indicator or Using a pH-meter/Autoburette (Acid alcohol: 100 mL 60% IPA+5 mL HCl fuming 37%)

1. Weigh 2.00 g pectin into a 250 mL glass beaker.

2. Add 100 mL acid alcohol and stir using a magnetic stirrer for 10 min.

3. Filtrate through a Buchner funnel with filter paper.

4. Rinse the beaker with 90 mL acid alcohol.

5. Wash with 1000 mL 60% IPA.

6. Wash with approx. 30 mL 100% IPA.

7. Dry the sample for approx. 15 min. on Buchner funnel with vacuum suction.

8. Weigh approx. 0.40 g of the sample in a 250 mL glass beaker.

10. Weigh two samples for duplicate determination. Deviation between duplicate determinations must not exceed 1.5% absolute, otherwise the test must be repeated.

11. Wet the pectin with approx. 2 mL 100% IPA and add approx. 100 mL deionized water while stirring using a magnetic stirrer.

The sample is now ready for titration (of the carboxyl groups in the pectin to calculate the percentage de-esterification), either by means of an indicator or by using a pH-meter/autoburette. The indicator method is described below.

Titration Using Indicator

1. Add 5 drops of phenolphtalein indicator and titrate with 0.1 M NaOH until change of colour (record it as V1 titer).

2. Add 20.0 mL 0.5 M NaOH while stirring. Leave covered with foil for exactly 15 min.

3. Add 20.0 mL 0.5 M HCl while stirring and stir until the colour disappears.

4. Add 3 drops of phenolphtalein indicator and titrate with 0,1 M NaOH until change of colour (record it as V2 titer).

The first titration (V1) quantifies all carboxylic acid groups that have no methyl esterification. Strong alkali is then added which saponifies the methyl esters and creates free carboxyls in their place. The second titration then quantifies these new carboxylic acid groups (V2) which were former ester groups.

Manual Calculations

Vt=V1+(V2−B1)

(V2−B1)×100%

DE (Degree of esterification)=Vt

% DFA (Degree of free acid)=100−% DE
194.1×Vt×C×100%
% GA* (Degree of galacturonic acid)=m
* On ash- and moisture-free basis
194.1: Molecular weight for GA
C: Corrected molarity of 0.1 M NaOH used for titration (e.g. 0.1002 M)
m: weight in mg of washed and dried sample for titration
acid washed, dried amount of pectin×100%
Pure pectin=weighed amount of pectin Example 1: Extraction of Pectin from Dried Lemon Peel 1) 529.4 g $Na_3$-citrate, $2 \cdot H_2O$ is added to 36 l de-ionized water and agitated until it is dissolved.
2) The solution is heated to 60° C.
3) 900 g dried peel is added.
4) The mixture is incubated at 60° C. under gentle agitation for 150 minutes. The agitation must suffice for keeping the pieces of peel suspended and in motion.
5) The fluid is filtered through a bed of Dicalite 4258 (DICALITE EUROPE nv, B-9000 GENT, http://www.dicalite-europe.com). The retained material is discarded and the fluid passing through the bed is weighed and collected for the below following operations. (This fluid is a solution with no or only a little dispersed insoluble material.)
6) Ion-exchanging resin Amberlite™ SR1 L NA Resin 25LT Bag, product # 10026751 (The Dow Chemical Company) is added in a dosage of 50 ml per liter of the liquid extract; the resin (which is small beads resembling salmon roe) is kept suspended by agitation for 30 minutes at ambient temperature.
7) The liquid extract is poured through a 60 μm nylon cloth (SEFAR PETEX 07-59/33, Sefar AG, 9410 Heiden, Switzerland, filtration@sefar.com). The retained material, viz. the used ion-exchanging resin, is discarded.
8) The fluid is poured into 3 parts of 80% 2-propanol while the 2-propanol is being agitated gently. A stringy precipitate of pectin will form.
9) The mixture is poured through a 60 μm nylon cloth (SEFAR PETEX 07-59/33). The cloth is then folded around the retained solid material (the stringy precipitate) and squeezed by hand for draining as much liquid away as possible. The solid material is collected for the below following operations. The liquid passing through is cloth is discarded.
10) The solid material from above is dried at 65° C. for 10±2 hours.
11) The dried material is weighed and then milled; the mill is furnished with a 300 μm screen. The powder that passes the screen is considered the pectin product.

Calculation of extraction yield: The pectin from above point (10) weighed before the milling 76.77 g while the fluid after sieving weighed 13375 g. Thus the pectin yield per liter of clarified extract was 5.74% w/w. For the mixture of point (4) a total of 36 l water was used. The pectin came out of 900 g peel, see point (3). The value for yield reported within the present document is calculated as follows:

yield=(5.74.36/900)·100% w/w=23.0% w/w

Whenever yield is referred to in the present document it has been calculated in this way. It should be noted that the calculation is an approximation: it ignores that the dry matter contents of the peel as well as the dried pectin may differ slightly from 100%. The yield describes the amount of pectin that was dissolved by the conditions of the extraction, and it includes the amount of pectin that perhaps would go lost in practical manufacturing because it would be caught in the discarded solid materials of above operations (6) and (7), in turn because said materials cannot be drained from all of their pectin-containing liquid.

Analytical Results for the Pectin: IV=8.3 dl/g; DM=8.7.

Discussion of Results: The IV is higher than any IV described in prior art for citrus pectin of DM equal to or less than 8.7. The yield is also surprisingly good and similar to what would be considered a good yield using traditional extraction.

Example 2, Extraction of Several Peel Lots with $Na_3$-Citrate

Figure 2:
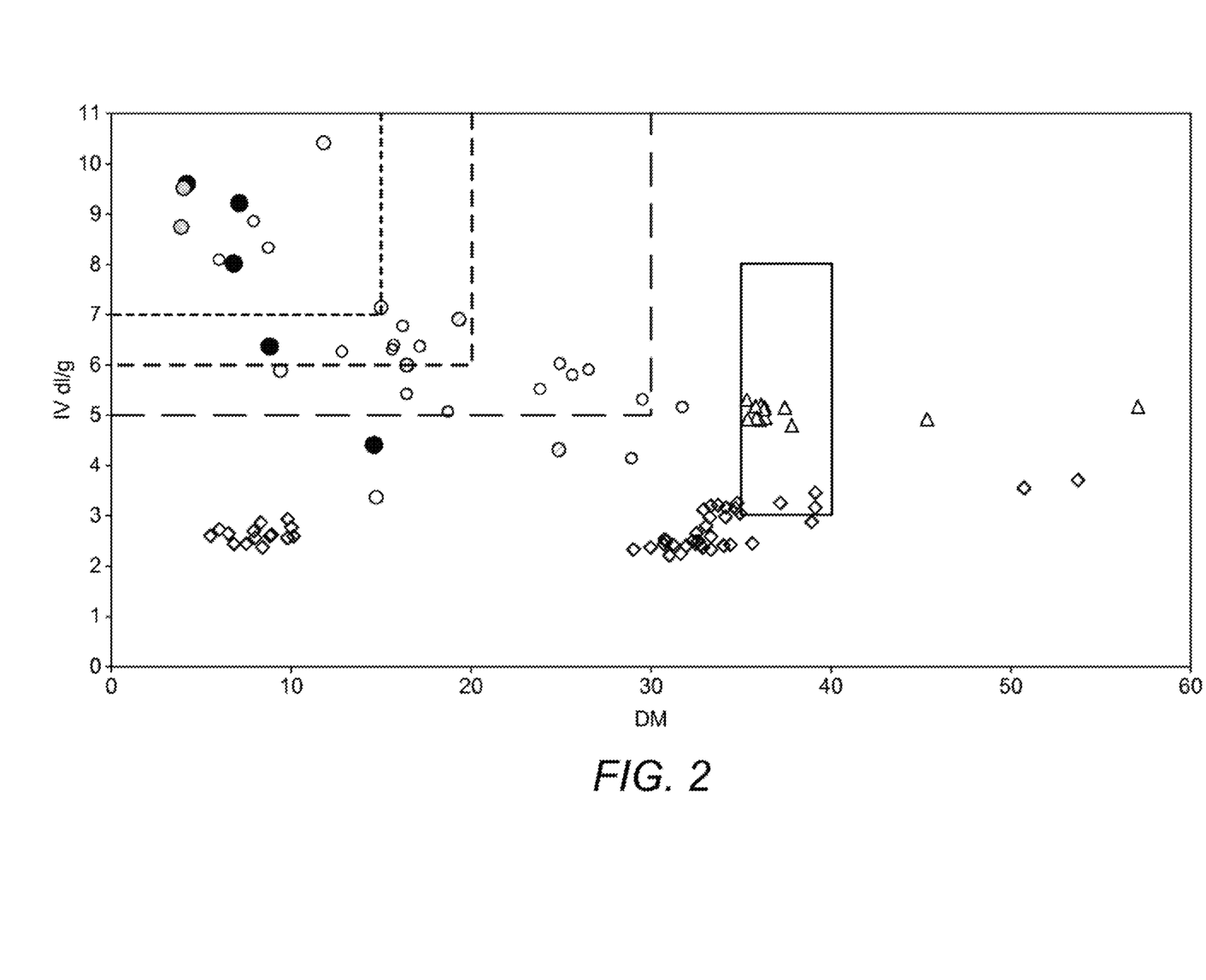
FIG. 2 shows IV and DM for pectins made with the described new method (circles). Pectin prepared by conventional acidic de-esterification is represented by diamonds, and pectin prepared by prior-art enzymatic de-esterification with enzymes is represented by triangles. Unfilled circles were productions in 18 liter scale, small circles with a slash represent 36 liter scale, and large filled circles 800 liter scale examples from Tables 2 (black solid fill) and 3 (grey solid fill). The rectangle (solid line) delimits the parameter space of enzymatically de-esterified pectin as described in Hoejgaard et al, Pectin for Heat Stable Bakery Jams (US20070621747 20070110). The claimed compositions are to the upper-left side, within the dotted lines.

Several pectin samples were produced with the production parameters specified in table 1 below while otherwise following the same steps as in example 1. The resulting yield, IV and DM are shown in table 1 below. PVIV is also quoted. PVIV is the yield multiplied by the IV. These results are shown in FIG. 2.

TABLE 1

| | Logistic | | | Production parameters | | | Result | | |
|---|---|---|---|---|---|---|---|---|---|
| Experiment ID | Total volume during liter | Peel type | Peel lot | $Na_3$-citrate dosage mmoles/l | Temperature °C. | Duration Minutes | Yield % w/w | Degree of esterification | Intrinsic viscosity dl/g | PVIV |
| EB-01 | 18 | lemon | A | 0.025 | 60 | 150 | 19.1 | 6.0 | 8.08 | 154 |
| EB-02 | 18 | lemon | B | 0.050 | 60 | 60 | 16.7 | 7.9 | 8.84 | 148 |
| EB-03 | 18 | lemon | B | 0.050 | 60 | 150 | 23.0 | 8.7 | 8.31 | 191 |
| EB-04 | 18 | lime | C | 0.050 | 60 | 20 | 21.3 | 29.5 | 5.29 | 113 |
| EB-05 | 18 | lime | C | 0.050 | 60 | 40 | 25.0 | 23.8 | 5.50 | 138 |
| EB-06 | 18 | lime | C | 0.050 | 60 | 60 | 27.7 | 17.1 | 6.35 | 176 |
| EB-07 | 18 | lime | C | 0.050 | 60 | 90 | 34.2 | 15.6 | 6.30 | 215 |
| EB-08 | 18 | lime | D | 0.040 | 64 | 240 | 35.1 | 16.4 | 5.41 | 190 |
| EB-09 | 18 | lime | D | 0.040 | 64 | 240 | 39.5 | 18.7 | 5.06 | 200 |
| EB-10 | 18 | lime | D | 0.025 | 60 | 120 | 22.9 | 28.9 | 4.13 | 95 |
| EB-11 | 18 | lime | D | 0.025 | 60 | 180 | 23.7 | 31.7 | 5.15 | 122 |
| EB-12 | 18 | lemon | E | 0.025 | 64 | 120 | 23.3 | 25.6 | 5.79 | 135 |
| EB-13 | 18 | lemon | E | 0.025 | 64 | 180 | 25.6 | 26.5 | 5.89 | 151 |
| EB-14 | 18 | lemon | E | 0.025 | 64 | 240 | 25.1 | 24.9 | 6.02 | 151 |
| EB-15 | 18 | lemon | E | 0.040 | 64 | 120 | 26.6 | 16.2 | 6.76 | 180 |
| EB-16 | 18 | lemon | E | 0.040 | 64 | 180 | 25.1 | 15.7 | 6.39 | 160 |
| EB-17 | 18 | lemon | E | 0.040 | 64 | 240 | 29.5 | 12.8 | 6.26 | 185 |
| EB-18 | 36 | lemon | F | 0.025 | 62 | 300 | 22.6 | 19.3 | 6.90 | 156 |

TABLE 1-continued

| | Logistic | | Production parameters | | | | | Result | | |
|---|---|---|---|---|---|---|---|---|---|---|
| Experiment ID | Total volume during liter | Peel type | Peel lot | Na$_3$-citrate dosage mmoles/l | Temperature ° C. | Duration Minutes | Yield % w/w | Degree of esterification | Intrinsic viscosity dl/g | PVIV |
| EB-19 | 36 | lemon | F | 0.040 | 62 | 300 | 27.6 | 9.4 | 5.87 | 162 |
| EB-20 | 36 | lemon | F | 0.040 | 75 | 300 | 37.0 | 14.7 | 3.36 | 124 |
| EB-21 | 36 | lemon | F | 0.033 | 75 | 120 | 32.0 | 24.9 | 4.31 | 138 |
| EB-22 | 36 | lemon | F | 0.033 | 62 | 120 | 22.3 | 15.0 | 7.13 | 159 |
| EB-23 | 36 | lemon | F | 0.033 | 68 | 120 | 25.5 | 16.4 | 5.98 | 152 |
| EB-24 | 36 | lemon | G | 0.033 | 62 | 90 | 17.4 | 11.8 | 10.40 | 181 |
| EB-25 | 800 | lemon | G | 0.033 | 62 | 90 | 17.1 | 4.2 | 9.59 | 164 |
| EB-26 | 800 | lemon | G | 0.033 | 62 | 150 | 17.3 | 7.1 | 9.20 | 159 |
| EB-27 | 800 | lemon | G | 0.033 | 66 | 90 | 19.6 | 6.8 | 8.00 | 157 |
| EB-28 | 800 | lemon | G | 0.033 | 70 | 90 | 22.0 | 8.8 | 6.35 | 140 |
| EB-29 | 800 | lemon | G | 0.033 | 74 | 90 | 26.5 | 14.6 | 4.40 | 117 |

Discussion of Results: The process is shown to provide pectin with a DM of 30 or less and an IV of 5 dl/g or more across various peel lots. It also is shown to work at buffer concentrations as low as 25mM and from temperatures ranging from 60-74° C.

The pH conditions for the above samples were as follows:

| pH conditions salt | mM | Without peel pH i sol. | + peel pH 1 min |
|---|---|---|---|
| Na$_3$Citrate | 40 | 8.5 | 6.05 |

Example 3: Extraction with Other Buffer Salts

Other salts than Na$_3$-Citrate may also find use for extraction. If Na$_2$H-Citrate is used, the pH during extraction will be lower than what it is when Na$_3$-Citrate is used. Sodium phosphates may also be used. Table 2 summarizes the results of extraction experiments with other salts while otherwise following the same steps as in example 1. All of the experiments shown in Table 2 were carried out in a volume of 18 l.

TABLE 2

| | Production parameters Result | | | | | | Result | | | |
|---|---|---|---|---|---|---|---|---|---|---|
| Experiment ID | Peel type | Peel lot | Buffer salt | Buffer salt dosage mmoles/l | Temperature ° C. | Duration Minutes | Yield w/w % | Degree of esterification | Intrinsic viscosity dl/g | PVIV |
| 01 | lemon | D | Na2HCitrate | 0.10 | 70 | 150 | 21.8 | 30 | 9.08 | 198 |
| 02 | orange | C | Na$_2$HPO$_4$ | 0.05 | 64 | 300 | 33.4 | 11.5 | 4.56 | 152 |

Discussion of Results: As can be seen various phosphate and citrate buffers stabilise the de-esterification enzyme within the peel and promote the release of pectin with a DM of 30 or less and an IV or 5 dl/g or more.

The pH of these solutions was as follows:

| pH conditions salt | mM | Without peel pH i sol. | + peel pH 1 min |
|---|---|---|---|
| Na$_2$HCitrate | 40 | 5.3 | 5.1 |
| Na$_2$HPO$_4$ | 40 | 9.1 | 6.7 |

Example 4: Extraction with High Peel/Water Ratio

A high dosage of citrate appears to enhance the extraction yield, but adds cost.

With the objective of improving the utilization of the citrate, we made two extractions with higher peel/water ratio and higher citrate/water ratio followed by sieving and then dilution shortly before filtration through Dicalite 4258. In this way the citrate could be present in high concentration throughout most of the duration of the extraction while there was only the usual consumption per amount of spent peel. Table 3 summarizes the results of these experiments.

TABLE 3

| | | | | |
|---|---|---|---|---|
| Logistic | Experiment ID | | 01 | 02 |
| | Total vol filtration start, liters | | 800 | 800 |
| Production Parameters | Peel type | | Lemon | Lemon |
| | Peel lot | | G | G |
| | Peel/water ratio before filtration | | 1:25 | 1:25 |
| | Na3-citrate dosage before filtration, mmoles/liter | | 0.053 | 0.053 |
| | Temperature before filtration, ° C. | | 62 | 62 |

TABLE 3-continued

| | | | |
|---|---|---|---|
| | Duration before filtration, minutes | 120 | 120 |
| | Na3-citrate dosage at fine filtration, mmoles/liter | 0.035 | 0.035 |
| | Temperature at fine filtration, ° C. | 62 | 62 |
| Results | Yield, % w/w | 19.6 | 18.0 |
| | Degree of esterification | 3.9 | 4.0 |
| | Intrinsic viscosity, dl/g | 8.73 | 9.50 |
| | PVIV | 171 | 171 |

Example 5: Comparative Example Using Known Extraction Methods

The peel lots that were used for the experiments were also tested by so-called "standard extraction" which is a routine method for quality control of peel before it is used for commercial pectin manufacturing. The standard extraction comprises the suspension of the peel in acidified water for seven hours @ 70° C. followed by filtration and isolation of the pectin as described in example 1. The mixture has prior to the extraction been acidified by adding so much nitric acid that the pH becomes 1.7 in the course of the extraction. Pectin made by standard extraction usually has DM about 67±about 4. The properties of the pectin samples that were produced by standard extraction of those peel lots that were used for the herein described experiments are compiled in table 4 below.

TABLE 4

| Logistic | | Result | | | |
|---|---|---|---|---|---|
| Peel type | Peel lot | Yield % w/w | Degree of esterification | Intrinsic viscosity dl/g | PVIV |
| orange | 1 | 23.2 | 57 | 4.2 | 97 |
| lemon | 2 | 19.0 | 61 | 5.3 | 101 |
| lemon | 3 | 21.2 | 61 | 5.2 | 109 |
| lemon | 4 | 27.2 | 64 | 5.3 | 143 |
| lemon | 5 | 26.1 | 65 | 5.1 | 133 |
| orange | 6 | 24.5 | 57 | 4.1 | 101 |
| orange | 7 | 29.4 | 62 | 4.9 | 144 |
| orange | 8 | 23.3 | 59 | 3.9 | 91 |
| lemon | 9 | 25.2 | 66 | 5.8 | 147 |
| lemon | 10 | 22.2 | 64 | 4.5 | 99 |
| lemon | 11 | 21.6 | 62 | 5.2 | 113 |
| lemon | 12 | 27.0 | 66 | 5.4 | 146 |
| orange | 13 | 22.3 | 60 | 4.6 | 102 |
| lemon | 14 | 29.9 | 65 | 5.3 | 157 |
| lemon | 15 | 29.6 | 64 | 5.1 | 149 |
| lemon | 16 | 26.5 | 66 | 5.5 | 147 |
| lemon | 17 | 25.9 | 65 | 5.3 | 138 |
| lime | 19 | 29.6 | 64 | 4.7 | 140 |
| lime | 20 | 28.7 | 67 | 4.9 | 140 |
| lime | 21 | 26.3 | 67 | 5.8 | 151 |
| orange | 22 | 24.3 | 64 | 5.0 | 122 |
| lemon | 23 | 27.5 | 65 | 5.4 | 149 |
| lemon | 24 | 29.9 | 69 | 5.8 | 174 |
| lemon | 25 | 27.7 | 66 | 5.6 | 156 |
| minimum | | 19.0 | 56.9 | 3.9 | 91 |
| maximum | | 29.9 | 68.7 | 5.8 | 174 |
| average | | 25.8 | 63.6 | 5.1 | 131 |

Various of the above examples in Table 4 (standard extraction) were carried out on the same peel lots as the examples in Table 1 (the claimed method).

For example, the same peel lot was used for samples EB-04 to EB-07 in Table 1 as for sample 19 in Table 4. As can be seen from comparing these samples, the claimed method produced pectin with a DM=15.6-29.5 and IV=5.29-6.30; whereas the standard extraction produced pectin with a DM=64 and IV=4.7.

The same peel lot was also used for samples EB-12 to EB-17 in Table 1 as for sample 23 in Table 4. As can be seen from comparing these samples, the claimed method produced pectin with a DM=12.8-26.5 and IV=5.79-6.76; whereas the standard extraction produced pectin with a DM=65 and IV=5.4.

Lastly, the same peel lot was also used for samples EB-24 to EB-29 in Table 1 as for sample 25 in Table 4. As can be seen from comparing these samples, the claimed method produced pectin with a DM=4.2-14.6 and IV=4.4-10.4; whereas the standard extraction produced pectin with a DM=66 and IV=5.6.

Other samples from Tables 5 and 6 were not useful for comparison as these are commercially available pectins which are generally from mixed peel lots.

Non-amidated LM-pectin, also referred to as "LMC-pectin", is a current commercial product. Table 5 lists properties of some lots LMC. It will be noted that the IV values of these pectin lots are much lower than those of the inventive pectin samples. There is no data for the manufacturing yield of the individual pectin lots of table 5, but a yield about 24% w/w can be considered typical of LMC production; and this yield has been assumed for calculating PVIV. Commercial product type in the below table refers to the designation of pectin class as sold.

TABLE 5

| Logistic | | Result | | | |
|---|---|---|---|---|---|
| ID No. | Commercial product type | Assumed yield % w/w | Degree of esterification | Intrinsic viscosity dl/g | PVIV |
| 01 | LM 12 CG | 24 | 34.9 | 3.04 | 72 |
| 02 | LM 12 CG | 24 | 34.1 | 2.97 | 70 |
| 03 | LM 13 CG | 24 | 39.1 | 3.44 | 81 |
| 05 | LM 18 CG | 24 | 39.1 | 3.15 | 75 |
| 06 | LM 18 CG | 24 | 38.9 | 2.87 | 68 |
| 07 | LM 22 C | 24 | 53.7 | 3.69 | 87 |
| 08 | LM 22 C | 24 | 50.7 | 3.54 | 84 |
| 09 | LM 12 CG | 24 | 34.0 | 2.39 | 57 |
| 10 | LM 12 CG | 24 | 32.5 | 2.43 | 57 |
| 11 | LM 12 CG | 24 | 31.2 | 2.41 | 57 |
| 12 | LM 12 CG | 24 | 32.8 | 2.40 | 57 |
| 13 | LM 12 CG | 24 | 34.4 | 2.41 | 57 |
| 14 | LM 12 CG | 24 | 32.0 | 2.39 | 57 |
| 15 | LM 12 CG | 24 | 32.9 | 2.35 | 56 |
| 16 | LM 12 CG | 24 | 31.0 | 2.20 | 52 |
| 17 | LM 12 CG | 24 | 34.7 | 3.14 | 74 |
| 18 | LM 12 CG FM | 24 | 34.2 | 3.15 | 74 |
| 19 | LM 12 CG FM | 24 | 37.2 | 3.24 | 77 |
| 20 | LM 12 CG FM | 24 | 33.3 | 2.95 | 70 |
| 21 | LM 12 CG | 24 | 32.9 | 3.11 | 74 |
| 22 | LM 12 CG FM | 24 | 32.9 | 3.11 | 74 |
| 23 | LM 12 CG | 24 | 33.7 | 3.20 | 76 |
| 24 | LM 12 CG | 24 | 33.3 | 3.18 | 75 |
| 25 | LM 12 CG | 24 | 34.8 | 3.24 | 77 |

TABLE 5-continued

| ID No. | Commercial product type | Assumed yield % w/w | Degree of esterification | Intrinsic viscosity dl/g | PVIV |
|---|---|---|---|---|---|
| 26 | LM 12 CG FM | 24 | 33.1 | 2.79 | 66 |
| 27 | LM 12 CG FM | 24 | 32.5 | 2.64 | 62 |
| 28 | LM 12 CG | 24 | 30.0 | 2.36 | 56 |
| 29 | LM 12 CG | 24 | 29.0 | 2.32 | 55 |
| 30 | LM 12 CG | 24 | 30.7 | 2.42 | 57 |
| 31 | LM 12 CG | 24 | 35.6 | 2.43 | 57 |
| 32 | LM 12 CG | 24 | 31.7 | 2.23 | 53 |
| 33 | LM 12 CG | 24 | 33.3 | 2.32 | 55 |
| 34 | LM 12 CG | 24 | 33.3 | 2.57 | 61 |
| 35 | LM 12 CG | 24 | 32.3 | 2.48 | 59 |
| 36 | LM 12 CG | 24 | 32.6 | 2.49 | 59 |
| 37 | LM 12 CG | 24 | 30.8 | 2.48 | 59 |
| 38 | LM 12 CG | 24 | 30.8 | 2.52 | 60 |
| 39 | LM5CS | 24 | 8.4 | 2.36 | 56 |
| 40 | LM5CS | 24 | 7.5 | 2.43 | 57 |
| 41 | LM5CS | 24 | 5.5 | 2.59 | 61 |
| 42 | LM5CSJ-QP | 24 | 6.0 | 2.72 | 64 |
| 43 | LM5CSJ | 24 | 8.8 | 2.59 | 61 |
| 44 | LM5CS | 24 | 9.8 | 2.55 | 60 |
| 45 | LM5CS | 24 | 8.0 | 2.55 | 60 |
| 46 | LM5CS | 24 | 10.1 | 2.58 | 61 |
| 47 | LM5CSJ-QP | 24 | 9.8 | 2.91 | 69 |
| 48 | LM5CSJ-QP | 24 | 10.0 | 2.75 | 65 |
| 49 | LM5CSJ-QP | 24 | 8.9 | 2.60 | 61 |
| 50 | LM5CS | 24 | 6.5 | 2.63 | 62 |
| 51 | LM5CS | 24 | 8.3 | 2.85 | 67 |
| 52 | LM5CS | 24 | 7.9 | 2.68 | 63 |
| 53 | LM5CS | 24 | 6.8 | 2.43 | 57 |
| minimum | → | | 5.5 | 2.2 | 52.0 |
| maximum | → | | 53.7 | 3.7 | 87.2 |
| average | → | | 26.8 | 2.7 | 64.2 |

DKPA200201033 and US20070621747 describe how pectin of DM about 30 to 40 can be made by enzymatically de-esterifying pectin of higher DM. Samples made according to this description are listed in table 6.

TABLE 6

| Logistic Experiment ID | Yield % w/w | Degree of esterification | Intrinsic viscosity dl/g | PVIV |
|---|---|---|---|---|
| LME 1 | 26.5 | 45.3 | 4.91 | 130 |
| LME 2 | 26.5 | 57.0 | 5.16 | 137 |
| LME 3 | 26.5 | 37.4 | 5.13 | 136 |
| LME 4 | 26.5 | 37.8 | 4.77 | 126 |
| LME 5 | 26.5 | 35.3 | 5.28 | 140 |
| LME 6 | 26.5 | 36.3 | 4.93 | 131 |
| LME 7 | 26.5 | 36.1 | 5.19 | 138 |
| LME 8 | 26.5 | 35.8 | 5.16 | 137 |
| LME 9 | 26.5 | 36.3 | 5.13 | 136 |
| LME 10 | 26.5 | 36.2 | 5.11 | 135 |
| LME 11 | 26.5 | 36.0 | 4.89 | 130 |
| LME 12 | 26.5 | 35.8 | 4.94 | 131 |
| LME 13 | 26.5 | 35.3 | 4.91 | 130 |
| minimum | 26.5 | 35.3 | 4.8 | 126.4 |
| maximum | 26.5 | 57.0 | 5.3 | 140.0 |
| average | 26.5 | 38.5 | 5.0 | 133.5 |

The samples of tables 1 through 6 are all depicted in FIG. 2 with DM as x-axis and IV as y-axis. The pectin of Hoejgaard (see box with solid line) has been represented in this diagram. This pectin is made by microbial pectin esterase enzyme.

As can be seen from the above tables and FIG. 2, the samples made by the new procedures described herein differ very distinctly from the prior art samples by being in the upper left part of the diagram, i.e. they possess a unique combination of low DM and high IV. The diagram shows the inventive composition produced by the new process described herein as a dotted line at an IV=5 dl/g and a DM of 30 or below..

Figure 3:
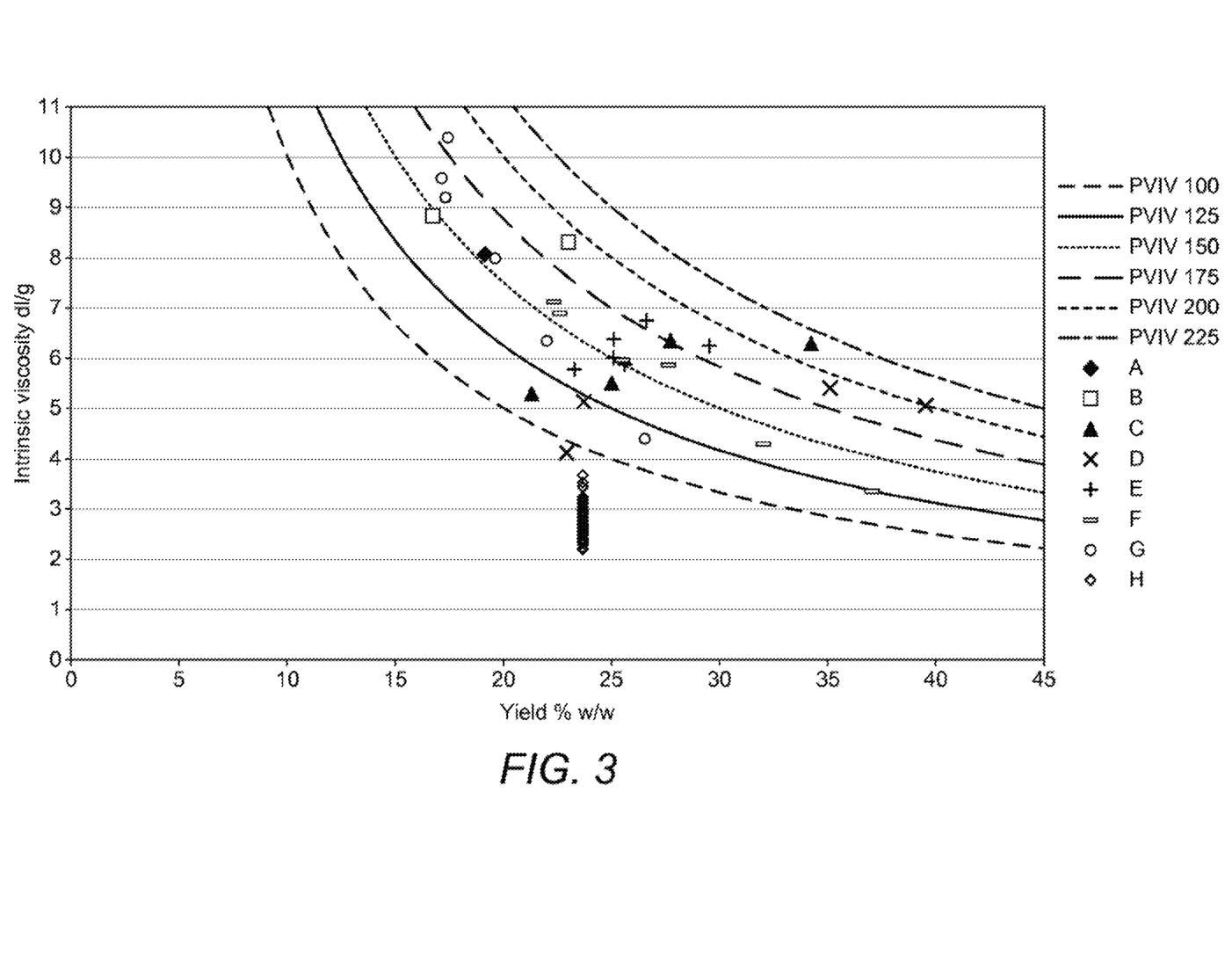
FIG. 3 shows IV and yield for pectins made with the described new method. Prior art pectin LMC: chemically de-esterified Low DM pectin (H: unfilled diamonds below the PVIV 100 dashed line) has been included for comparison. Abbreviations A-G are different peel producers.

The same samples are also depicted in FIG. 3 in which the yield is x-axis and IV is y-axis. As can be seen from this figure, the samples made by the new procedure described herein have in general higher IV and higher yield than previous de-esterification methods. For example, chemically de-esterified pectin (i.e. that made by alkaline saponification or acid hydrolysis) is represented by unfilled diamonds (H).

Example 6, Use of New Pectin for Suspending Cake-beads in a Delicate Gel

Solutions of inventive pectin samples and (for reference) some other pectin samples outside the parameters claimed were made by dry mixing 0.25 g pectin with 5 g sucrose and then dispersing the powder blend into 500 g pure de-ionized water under agitation at room temperature. Agitation was continued for 10 minutes.

Test System:
Haake Mars, Thermo Scientific, CPS100120, II rheometer (Thermo Fisher Scientific, Waltham, MA USA 02451) with the following settings and parameters:
measuring geometry FL40 (FL40 vane spindle)
temperature controller DC30 set for 25° C.
gap 4.000 mm
Procedure:
a) 150 ml 0.05% w/w pectin solution was placed in a Cup (44mm diameter, 120mm long) at 25° C. +/−0,1° C.
b) A vane tool (FL40—diameter 40 mm) was inserted into the fluid
c) A measuring sequence with agitation, shear rate 25 s-1 for 1 min, was started.
d) At the beginning of this sequence, the sample was acidified by adding 2 ml 10% citric acid solution After the 1 min of mixing time, the solutions or gels were the evaluated in an oscillation test with an applied stress=1.0 Pa and an oscillating frequency=1 Hz. The apparent viscosity (symbol η*) and the apparent storage modulus (symbol G') were read after 30 minutes.

The results are summarized in table 7 below.

TABLE 7

Figure 5:
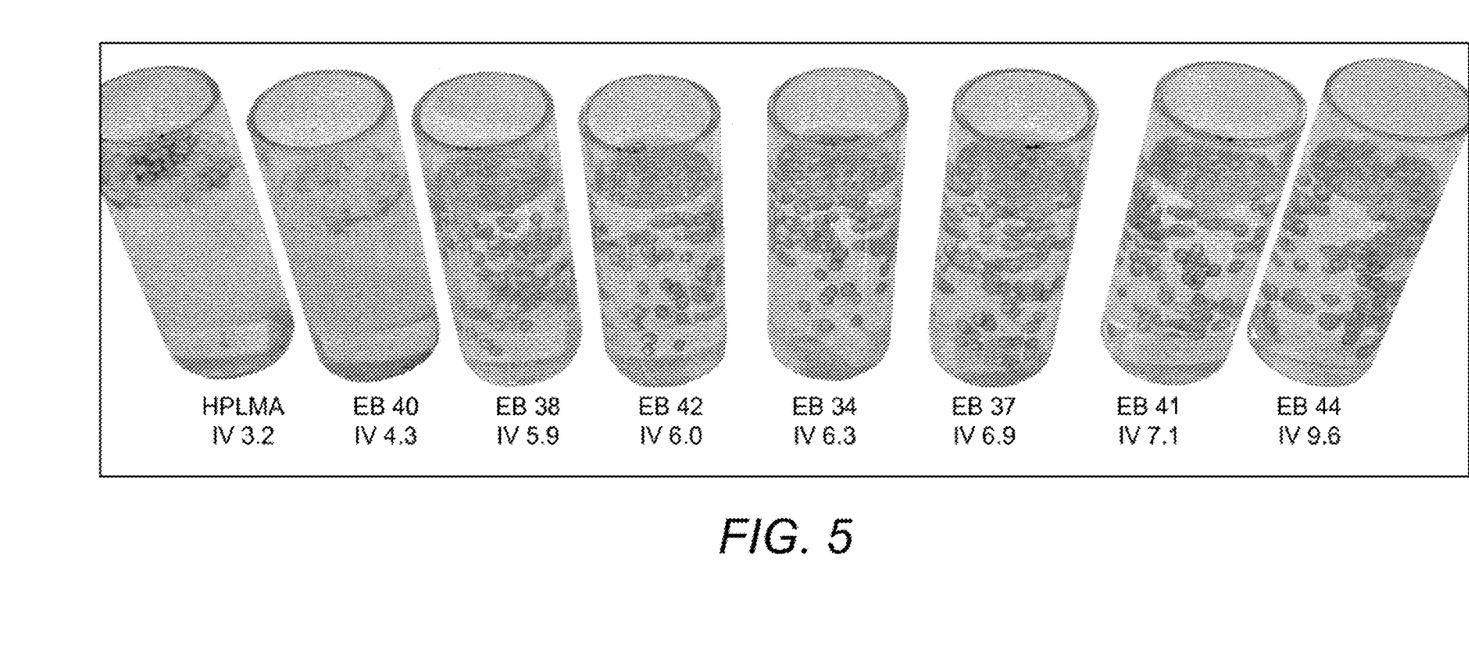
FIG. 5 shows "Silver pearls" (for cake decoration etc.) suspended in acidified pectin solution.

| Logistic Experiment ID | Nomecnlature used in FIG. 5 | Independent parameters | | | Rheology results | |
|---|---|---|---|---|---|---|
| | | Degree of esterification | Intrinsic viscosity dl/g | pH of 0.3% pectin in pure water | (G', elastic modulus Pa | n*; viscosity mPas · s |
| FG-01 | EB-34 | 12.8 | 6.26 | 5.12 | 0.502 | 229.7 |
| FG-02 | EB-34 | 12.8 | 6.26 | 5.12 | 0.459 | 218.7 |
| FG-03 | EB-37 | 19.1 | 6.9 | 4.42 | 1.310 | 346.9 |
| FG-04 | EB-37 | 19.1 | 6.9 | 4.42 | 1.200 | 333.8 |
| FG-05 | EB-38 | 9.4 | 5.9 | 4.03 | 1.100 | 314.4 |
| FG-06 | EB-38 | 9.4 | 5.9 | 4.03 | 1.100 | 321.6 |
| FG-07 | | 14.7 | 3.36 | 4.28 | 0.180 | 141.8 |
| FG-08 | | 14.7 | 3.36 | 4.28 | 0.184 | 138.3 |
| FG-09 | EB-40 | 24.9 | 4.31 | 4.24 | 0.106 | 169.5 |
| FG-10 | EB-41 | 15.0 | 7.13 | 3.88 | 1.580 | 418.2 |
| FG-11 | EB-41 | 15.0 | 7.13 | 3.88 | 1.510 | 421.4 |
| FG-12 | EB-42 | 16.4 | 6 | 3.99 | 0.882 | 291.1 |
| FG-13 | EB-42 | 16.4 | 6 | 3.99 | 0.869 | 285.9 |
| FG-14 | | 16.7 | 5.88 | 3.75 | 0.232 | 175.9 |
| FG-15 | | 16.7 | 5.88 | 3.75 | 0.270 | 179.0 |
| FG-16 | | 39.6 | 2.7 | 4.75 | 0.329 | 137.8 |
| FG-17 | | 37.6 | 10.2 | 4.89 | 1.900 | 500.0 |
| FG-18 | | 37.6 | 10.2 | 4.89 | 1.810 | 483.2 |
| FG-19 | EB-44 | 4.2 | 9.6 | 4.47 | 2.360 | 501.7 |
| FG-20 | EB-44 | 4.2 | 9.6 | 4.47 | 2.090 | 438.9 |
| FG-21 | | 7.8 | 9.2 | 4.78 | 1.690 | 487.9 |
| FG-22 | | 7.8 | 9.2 | 4.78 | 1.530 | 430.3 |
| FG-23 | | 11.6 | 3.2 | | 0.320 | 137.8 |
| FG-24 | | 11.6 | 3.2 | | 0.322 | 138.8 |

The results can be compared relative to each other, but they cannot be taken as absolute measures for η* and G' since a vane spindle was used.

Figure 4:
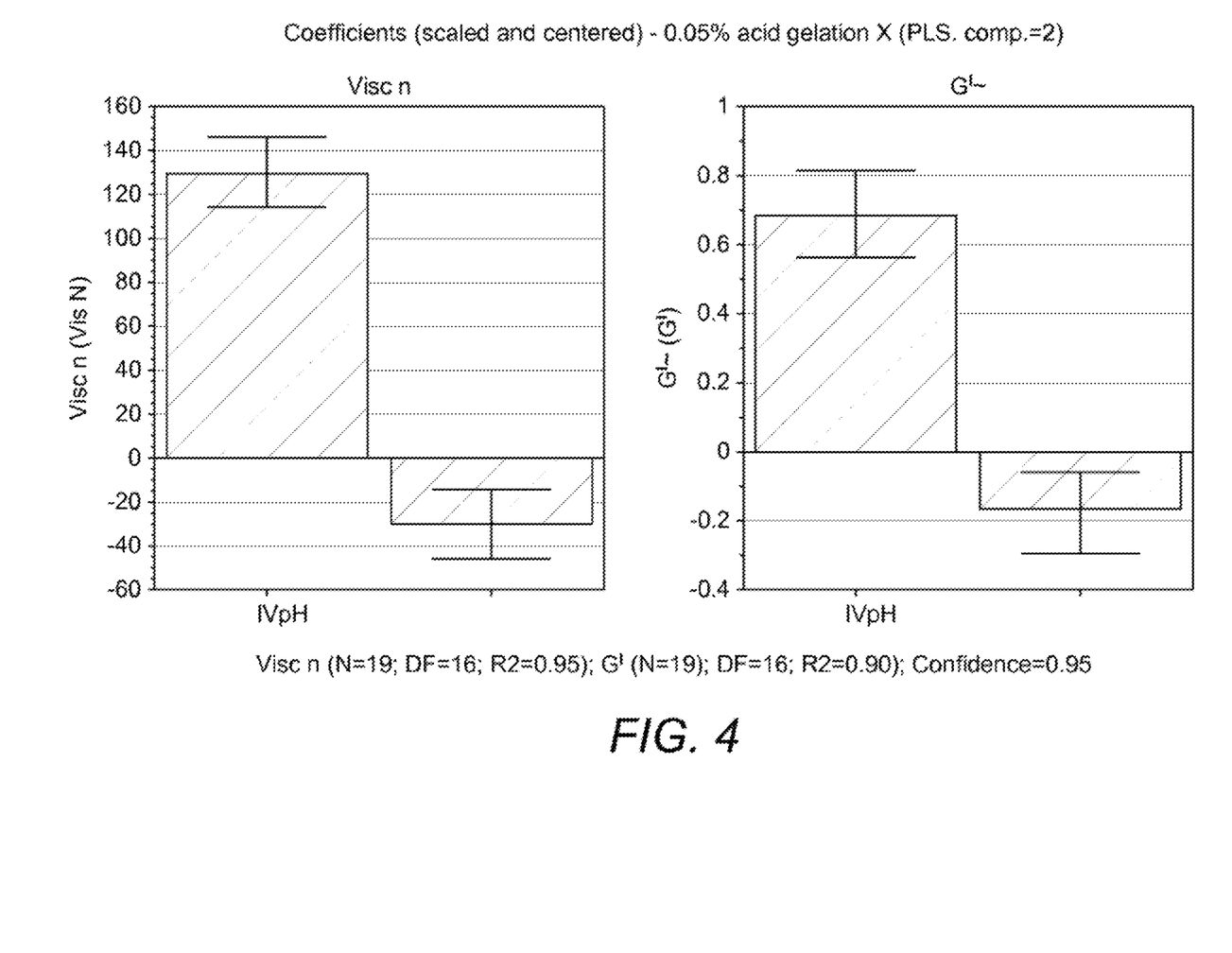
FIG. 4 shows MODDE coefficients in the linear models for apparent η=f(DM, IV, pH) and apparent G'=f(DM, IV, pH).

The data of table 7 was analyzed with MODDE software in order to describe how the rheology outcomes, apparent η* and G', depend upon the independent parameters, pectin DM, pectin IV, and pectin pH. "Pectin pH" here means the pH that the pectin provides when dissolved in a concentration of 0.3% w/w in pure de-ionized water. The MODDE coefficients have been summarized as FIG. 4. The diverse solutions used in Table 7 above show that IV is the parameter with strongest influence.

The pectin solutions of table 7 were further used for suspending insoluble materials in the solutions or gels. "Silver pearls" (Dr. Oetker Danmark A S, Sydvestvej 15, 2600 Glostrup) were gently stirred into the liquids; said "Silver pearls" are spheres of about 4 mm diameter designed for decorating desserts or cakes. The result is shown as FIG. 5. The preparations of FIG. 5 are semi-liquid or weakly gelled in the sense that they float upon gently swirling/ twisting their glass containers (shown in FIG. 5), but upon ceasing the motion of a container, the beads end their motion with a reversal of the original direction of said motion; this is taken as evidence of a gel. As is evident from FIG. 5, the beads remain suspended in the solutions of pectin with high IV while they settle at the bottom in solutions of pectin with low IV. The suspending action that here is shown with "Silver pearls" could also be suspension of other food items, for example spices and pieces of vegetables in a salad dressing.

The invention claimed is:

1. A de-esterification process comprising:
   incubating a citrus peel in a solution comprising (a) a buffer, wherein the buffer maintains a pH of the solution containing the citrus peel in a range from 5 to 8, and (b) a calcium binder, at a temperature in a range from 55° C. to 75° C.,
   to produce a pectin having a degree of methyl esterification of 30 or less and an intrinsic viscosity of from 5 dl/g to 10.4 dl/g;
   wherein the intrinsic viscosity is determined on a 1 mg/ml sample of the pectin in a 0.3 M lithium acetate buffer at a pH of 4.6, using gel permeation chromatography at a temperature of 37° C.

2. The process of claim 1, wherein a concentration of the buffer is at least 0.02M.

3. The process of claim 1, wherein the temperature in the incubating step is in a range from 59° C. to 65° C.

4. The process of claim 1, wherein the calcium binder of (b) is also the buffer of (a).

5. The process of claim 1, wherein the calcium binder comprises:
   a) Na2H-Citrate;
   b) Na3-Citrate;
   c) Na2H-phosphate;
   d) Na3-phosphate; or
   any combination thereof.

6. The process of claim 1, wherein the calcium binder comprises cation exchange beads.

7. The process of claim 1, wherein the incubation step is conducted for at least 30 minutes.

8. The process of claim 1, wherein the citrus peel comprises orange peel, lemon peel, grapefruit peel, lime peel, or a combination thereof.

9. The process of claim 1, wherein a concentration of the buffer is from 0.02M to 0.5M.

10. The process of claim 9, wherein the calcium binder comprises Na3-Citrate.

11. The process of claim 1, wherein the degree of methyl esterification is 25 or less.

12. The process of claim 11, wherein the intrinsic viscosity is from 6 dl/g to 10.4 dl/g.

13. The process of claim 12, wherein the citrus peel comprises orange peel, lemon peel, grapefruit peel, lime peel, or a combination thereof.

14. The process of claim 13, wherein a concentration of the buffer is from 0.02M to 0.5M.

15. The process of claim 13, wherein the calcium binder of (b) is also the buffer of (a).

16. The process of claim 13, wherein the calcium binder comprises:
 a) Na2H-Citrate;
 b) Na3-Citrate;
 c) Na2H-phosphate;
 d) Na3-phosphate; or
 any combination thereof.

17. The process of claim 13, wherein:
the degree of methyl esterification is 20 or less; and
the intrinsic viscosity is from 7 dl/g to 10.4 dl/g.

18. A de-esterification process comprising:
 incubating a citrus peel in a solution comprising (a) a buffer, wherein the buffer maintains a pH of the solution containing the citrus peel in a range from 5 to 8, and (b) a calcium binder,
 to produce a pectin having a degree of methyl esterification of 25 or less and an intrinsic viscosity of from 7 dl/g to 10.4 dl/g;
 wherein the intrinsic viscosity is determined on a 1 mg/ml sample of the pectin in a 0.3 M lithium acetate buffer at a pH of 4.6, using gel permeation chromatography at a temperature of 37° C.

19. The process of claim 18, wherein the degree of methyl esterification is 20 or less.

20. The process of claim 19, wherein the intrinsic viscosity is from 7 dl/g to 9.6 dl/g.

21. The process of claim 18, wherein the degree of methyl esterification is 15 or less.

22. The process of claim 21, wherein the intrinsic viscosity is from 7 dl/g to 9.6 dl/g.

23. The process of claim 22, wherein the pectin is an orange, lemon, lime or grapefruit pectin.

24. The process of claim 23, wherein the degree of methyl esterification is 10 or less.

25. A de-esterification process comprising:
 incubating a citrus peel in a solution comprising (a) a buffer, wherein the buffer maintains a pH of the solution containing the citrus peel in a range from 5 to 8, and (b) a calcium binder comprising cation exchange beads and/or Na3-Citrate,
 to produce a pectin having a degree of methyl esterification of 30 or less and an intrinsic viscosity of from 5 dl/g to 10.4 dl/g;
 wherein the intrinsic viscosity is determined on a 1 mg/ml sample of the pectin in a 0.3 M lithium acetate buffer at a pH of 4.6, using gel permeation chromatography at a temperature of 37° C.

26. The process of claim 25, wherein:
the incubating step is conducted at a temperature in a range from 59° C. to 65° C.;
the degree of methyl esterification is 25 or less; and
the intrinsic viscosity is from 7 dl/g to 10.4 dl/g.

* * * * *